(12) United States Patent
Takura

(10) Patent No.: US 11,265,424 B2
(45) Date of Patent: Mar. 1, 2022

(54) IMAGE FORMING APPARATUS

(71) Applicant: CANON KABUSHIKI KAISHA, Tokyo (JP)

(72) Inventor: Keizo Takura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/832,575

(22) Filed: Mar. 27, 2020

(65) Prior Publication Data

US 2020/0329158 A1  Oct. 15, 2020

(30) Foreign Application Priority Data

Apr. 15, 2019 (JP) .............................. JP2019-076956

(51) Int. Cl.
*H04N 1/00* (2006.01)
*G03G 15/08* (2006.01)

(52) U.S. Cl.
CPC ..... *H04N 1/00087* (2013.01); *G03G 15/0848* (2013.01); *H04N 1/00037* (2013.01); *G03G 2215/00033* (2013.01)

(58) Field of Classification Search
CPC ........... H04N 1/00002; H04N 1/00007; H04N 1/00013; H04N 1/00029; H04N 1/00037; H04N 1/00082; H04N 1/00087; H04N 1/00909; G03G 15/5062; G03G 2215/00177
See application file for complete search history.

(56) References Cited

U.S. PATENT DOCUMENTS

| | | | |
|---|---|---|---|
| 5,258,783 A | 11/1993 | Sasanuma et al. | 346/157 |
| 2007/0188784 A1* | 8/2007 | Nishioka | H04N 1/00053 358/1.9 |
| 2007/0285743 A1 | 12/2007 | Hirayama | 358/504 |
| 2012/0044515 A1* | 2/2012 | Ikegawa | H04N 1/0005 358/1.13 |
| 2017/0353611 A1* | 12/2017 | Koyama | H04N 1/4092 |

FOREIGN PATENT DOCUMENTS

| | | |
|---|---|---|
| JP | 2002-059626 | 2/2002 |
| JP | 2002-185725 | 6/2002 |

* cited by examiner

*Primary Examiner* — Thomas S Giampaolo, II
(74) *Attorney, Agent, or Firm* — Venable LLP

(57) ABSTRACT

An image forming apparatus includes an image forming unit configured to form an image, a reader having a transparent member, the reader being configured to read an original through intermediation of the transparent member, a document feeder configured to feed the original in order to read the original by the reader, a reader image processor, and a controller. The controller is configured to control the image forming unit to form a test chart on a sheet, to control the reader image processor to detect the dust on the transparent member based on a result of reading the test chart, and to generate a conversion condition based on other signal values excluding an abnormal signal value caused by the dust on the transparent member.

9 Claims, 11 Drawing Sheets

FIG. 5A

TEST CHART FOR USE IN CALIBRATION IS PRINTED

[ PRINT ]

FIG. 5B

SET TEST CHART ON ADF TO READ TEST CHART

[ EXECUTE READING ]

SCREEN A

| Y1 | Y11 | M1 | M11 | C1 | C11 | K1 | K11 |
|----|-----|----|-----|----|-----|----|-----|
| Y2 | Y12 | M2 | M12 | C2 | C12 | K2 | K12 |
| Y3 | Y13 | M3 | M13 | C3 | C13 | K3 | K13 |
| Y4 | Y14 | M4 | M14 | C4 | C14 | K4 | K14 |
| Y5 | Y15 | M5 | M15 | C5 | C15 | K5 | K15 |
| Y6 | Y16 | M6 | M16 | C6 | C16 | K6 | K16 |
| Y7 | Y17 | M7 | M17 | C7 | C17 | K7 | K17 |
| Y8 | Y18 | M8 | M18 | C8 | C18 | K8 | K18 |
| Y9 | Y19 | M9 | M19 | C9 | C19 | K9 | K19 |
| Y10 | Y20 | M10 | M20 | C10 | C20 | K10 | K20 |

↑ CONVEYANCE DIRECTION

SCREEN B

| Y1 | Y11 | M1 | M11 | C1 | C11 | K1 | K11 |
|----|-----|----|-----|----|-----|----|-----|
| Y2 | Y12 | M2 | M12 | C2 | C12 | K2 | K12 |
| Y3 | Y13 | M3 | M13 | C3 | C13 | K3 | K13 |
| Y4 | Y14 | M4 | M14 | C4 | C14 | K4 | K14 |
| Y5 | Y15 | M5 | M15 | C5 | C15 | K5 | K15 |
| Y6 | Y16 | M6 | M16 | C6 | C16 | K6 | K16 |
| Y7 | Y17 | M7 | M17 | C7 | C17 | K7 | K17 |
| Y8 | Y18 | M8 | M18 | C8 | C18 | K8 | K18 |
| Y9 | Y19 | M9 | M19 | C9 | C19 | K9 | K19 |
| Y10 | Y20 | M10 | M20 | C10 | C20 | K10 | K20 |

FIG. 6

| Y3 | Y13 | M3 |
|----|-----|----|
| Y4 | Y14 | M4 |
| Y5 | Y15 | M5 |

FIG. 10A

| Y3 | Y13 | M3 |
|----|-----|----|
| Y4 | Y14 | M4 |
| Y5 | Y15 | M5 |

FIG. 10B

| Y3 | Y13 | M3 |
|----|-----|----|
| Y4 | Y14 | M4 |
| Y5 | Y15 | M5 |

FIG. 10C

IMAGE FORMING APPARATUS

BACKGROUND OF THE INVENTION

Field of the Invention

The present disclosure relates to an image forming apparatus configured to, for example, form an image based on an image signal representing an original image read from an original.

Description of the Related Art

An electrophotographic image forming apparatus forms an image onto a sheet by the following image forming process. First, the image forming apparatus uniformly charges a surface of a photosensitive member. The image forming apparatus converts an image signal through use of, for example, a γ look-up table (γLUT) in order to match a density tone characteristic of an image represented by the image signal with a density tone characteristic of an image to be formed on the sheet. The image forming apparatus irradiates the uniformly-charged surface of the photosensitive member with light based on the converted image signal to form an electrostatic latent image on the surface of the photosensitive member. The image forming apparatus develops the electrostatic latent image through use of toner or other developer to form a developer image on the surface of the photosensitive member. The image forming apparatus transfers and fixes this developer image to the sheet to form an image on the sheet. In a case where a color image is to be formed, the image forming apparatus individually forms developer images of a plurality of colors, and superimposes the developer images one on another to generate a color image.

As described above, the image forming process includes a large number of steps. Therefore, the formed image may vary in density and hue due to influences such as an installation environment of the image forming apparatus, change over time of the image forming apparatus, environmental change of the image forming apparatus, and replacement of consumables. The image density variation is corrected by forming a predetermined test chart and performing correction based on an image density detected from this test chart.

The image forming apparatus having mounted thereon a reader or other image reading apparatus configured to read an original image from an original performs calibration (automatic tone correction) through use of the image reading apparatus as a method of suppressing variation of the image density (U.S. Pat. No. 5,258,783 A). Through calibration using the image reading apparatus, an influence caused by long-term variation, for example, variation in the installation environment, is suppressed. The image forming apparatus selects several tone expression methods in accordance with apparatus characteristics and image characteristics to use different tone expression methods depending on image types such as letters/line drawing, graphics, maps, photographic paper print, and printing. Therefore, the image forming apparatus disclosed in Japanese Patent Application Laid-open No. 2002-59626 prints the test charts onto a plurality of sheets to adjust tone correction or other image processing conditions.

Calibration involves operator's work of setting the sheet having the test chart formed thereon to the image reading apparatus. Therefore, it is troublesome for the user to frequently perform calibration. In view of this, in United States Patent Application Publication No. 2007/0285743 A1, there is disclosed a method of using an automatic document feeder in a case where test charts on a plurality of sheets are read, so as to reduce the load of the operator's work. In a case of using the automatic document feeder, in a case where dust or other dirt is present at a position at which the original image is read, generation of a black streak or other abnormality occurs in a read image corresponding to a reading result. In Japanese Patent Application Laid-open No. 2002-185725, there is disclosed a correction method of, in a case where the read image has abnormality, replacing a pixel signal of a pixel having abnormality with a pixel signal of a surrounding pixel to correct the read image.

When the read image of the test chart for calibration has abnormality, and the pixel signal of the pixel having abnormality is replaced with the pixel signal of the surrounding pixel to correct the read image, the calibration may be affected depending on the position at which the black streak is generated due to dust or other dirt. The same holds true also in the test charts for adjustment of image forming conditions other than calibration. The present disclosure provides an image forming apparatus capable of adjusting image forming conditions with high accuracy even when abnormality occurs in a read image of a test chart for adjustment of an image forming condition.

SUMMARY OF THE INVENTION

An image forming apparatus according to the present disclosure includes an image forming unit configured to form an image; a reader having a transparent member, the reader being configured to read an original through the transparent member; a document feeder configured to feed the original in order to read the original by the reader; a reader image processor configured to: detect dust on the transparent member from a reading result by the reader; and correct the reading result based on a detection result of dust on the transparent member, and a controller configured to: convert the corrected reading result based on a conversion condition, wherein the image forming unit forms an output image based on the converted corrected reading result; control the image forming unit to form a test chart on a sheet; control the document feeder to read the test chart on the sheet by the reader; and generate the conversion condition based on a reading result of the test chart by the reader, wherein, in a case where the dust on the transparent member is detected from the reading result of the test chart by the reading image processor, the controller generates the conversion condition based on non-abnormal reading result of the test chart that excluded an abnormal reading result corresponding to the dust from the reading result of the test chart.

Further features of the present invention will become apparent from the following description of exemplary embodiments (with reference to the attached drawings).

BRIEF DESCRIPTION OF THE DRAWINGS

FIG. 5A and FIG. 5B are exemplary diagrams of an operation screen.

FIG. 6 is an explanatory diagram of a test chart.

FIG. 10A, FIG. 10B, and FIG. 10C are explanatory views of a detection range of an image density.

DESCRIPTION OF THE EMBODIMENTS

Figure 1:
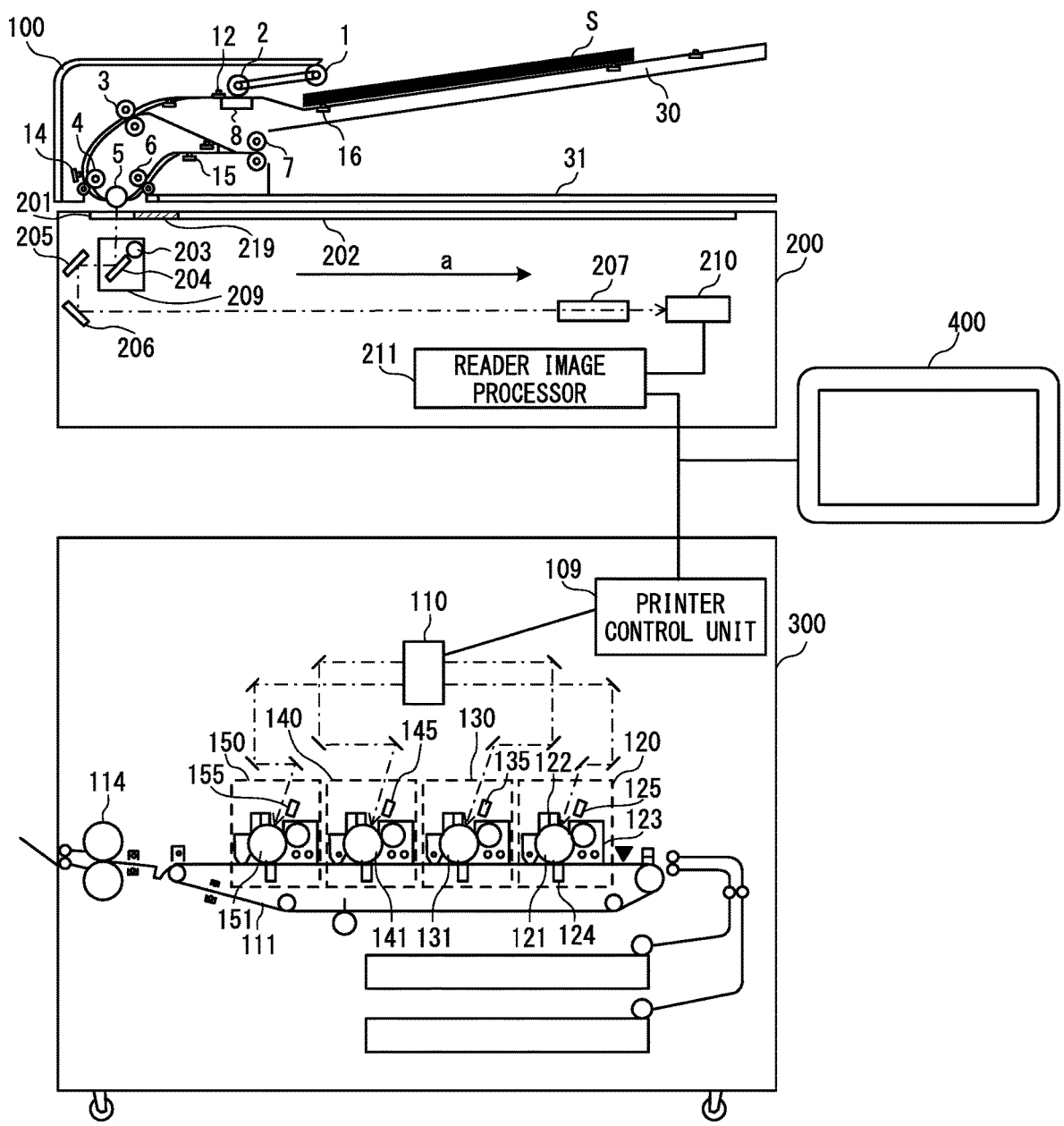
FIG. 1 is an explanatory view of an image forming apparatus according to at least one embodiment of the present disclosure.

Now, at least one embodiment of the present invention is described with reference to the accompanying drawings.
Overall Configuration FIG. 1 is an explanatory view of an image forming apparatus according to at least one embodiment of the present disclosure. An image forming apparatus (hereinafter referred to as "printer") 300 according to at least one embodiment includes an automatic document feeder (hereinafter referred to as "ADF") 100, an image reading apparatus (hereinafter referred to as "reader") 200, and an operation panel 400. The ADF 100 conveys originals S one by one to a position at which the reader 200 reads the original S. The original S is a sheet having an image formed thereon. The reader 200 optically reads an original image on the original S conveyed by the ADF 100 to generate an image signal. The printer 300 receives the image signal from the reader 200 to perform image forming processing based on the image signal. The operation panel 400 is a user interface, and includes an input device and an output device. Examples of the input device include various key buttons such as an input key, numeric keys, a start key, and a stop key, and a touch panel. Examples of the output device include a display and a speaker.
ADF 100 and Reader 200

The ADF 100 includes an original tray 30 onto which the originals S are to be set, a conveyance path through which the originals S are to be conveyed, and a sheet discharge tray 31 onto which the conveyed originals S are to be discharged. In the conveyance path, in order from the upstream in a conveyance direction of the original S, a sheet feeding roller 1, a separation roller 2, a separation pad 8, registration rollers 3, rollers 4, a roller 5, post-original-reading rollers 6, and discharge rollers 7 are provided in this order. A position right below the roller 5 corresponds to the position at which the reader 200 reads the original S. On the original tray 30, an original presence/absence detection sensor 16 is provided to detect presence or absence of the original S on the original tray 30. On the downstream of the separation roller 2 and the separation pad 8, a post-separation sensor 12 is provided. On the upstream of the rollers 4, a read sensor 14 is provided. On the downstream of the post-original-reading rollers 6, a sheet discharge sensor 15 is provided.

The reader 200 includes, on a surface of a casing opposing the ADF 100, a flow reading glass 201, a platen 202, and a reference white plate 219. The reader 200 includes, inside the casing, a scanner unit 209, reflection mirrors 205 and 206, a lens 207, a sensor unit 210, and a reader image processor 211. The scanner unit 209 includes a light source 203 and a reflection mirror 204. The scanner unit 209 is movable in an arrow "a" direction of FIG. 1.

The flow reading glass 201 is provided at a position at which the original S conveyed by the ADF 100 is read. The flow reading glass 201 corresponds to a transparent member. On the platen 202, the original S is placed with its surface to be read being faced down. The reader 200 can read the original image of the original S conveyed by the ADF 100, and can also read the original image of the original S placed on the platen 202. The reference white plate 219 is read at the time of shading correction, and serves as a reference of white. When the scanner unit 209 reads the original image from the original S conveyed by the ADF 100, the scanner unit 209 performs a reading operation while being fixed right below the flow reading glass 201. When the scanner unit 209 reads the original image from the original S placed on the platen 202, the scanner unit 209 performs the reading operation while moving in the arrow "a" direction.

Figure 2:
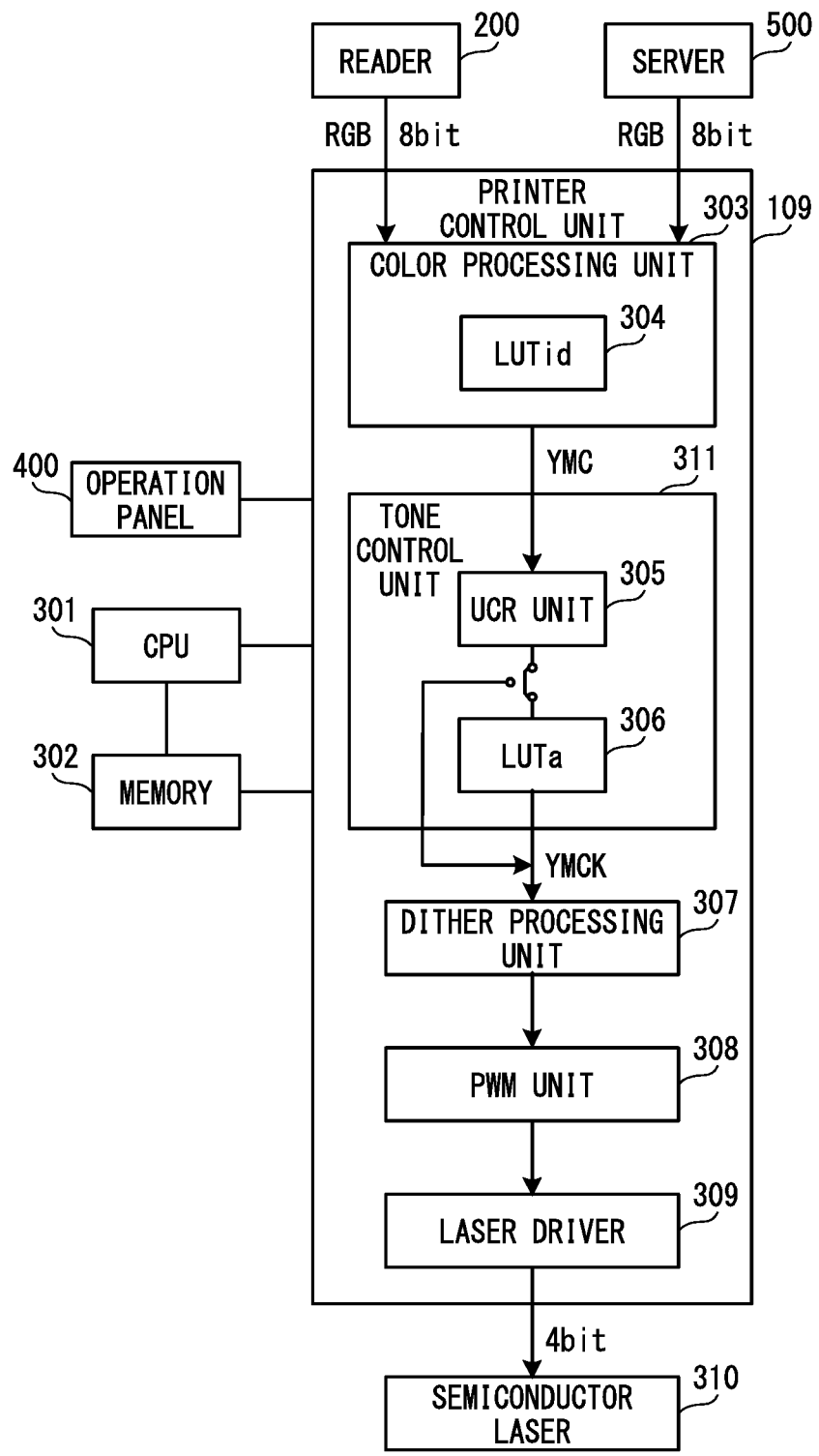
FIG. 2 is an explanatory diagram of a printer control unit.

The operations of the ADF 100 and the reader 200 are controlled by a CPU 301 (FIG. 2). The CPU 301 (FIG. 2) receives an instruction to read the original from the operation panel 400 to control the operations of the ADF 100 and the reader 200, to thereby read the original image from the original S. The CPU 301 (FIG. 2) causes the reader image processor 211 to perform image processing on the reading result to generate an image signal representing the original image. The CPU 301 (FIG. 2) transmits the generated image signal to the printer 300. The transmitted image signal includes luminance values (luminance information) of red, green, and blue (R, G, and B) for every pixel.

The image reading processing to be performed by the ADF 100 and the reader 200 is described. When the original image is read through use of the ADF 100, the reader 200 causes the scanner unit 209 to move to a position right below the reference white plate 219 in response to the instruction of the CPU 301 (FIG. 2) to read the reference white plate 219, to thereby perform shading correction. After the shading correction is ended, the reader 200 causes the scanner unit 209 to move to a position right below the flow reading glass 201, and waits until the original S is conveyed to the reading position.

The ADF 100 drops the sheet feeding roller 1 onto the uppermost original S of an original bundle formed of a plurality of originals stacked on the original tray 30, in response to the instruction of the CPU 301 (FIG. 2), to thereby start feeding of the uppermost original S. The separation roller 2 and the separation pad 8 separate the originals S one by one by a known separation technology so that the originals S fed from the sheet feeding roller 1 are conveyed one by one. The sheet feeding roller 1, the separation roller 2, and the separation pad 8 enable the originals S to be fed through the conveyance path one by one from the original tray 30. The separation roller 2 conveys the original S to the registration rollers 3. The post-separation sensor 12 detects the original S conveyed to the registration rollers 3 by the separation roller 2. When the CPU 301 (FIG. 2) detects that a trailing edge of the original S passes through a detection range of the post-separation sensor 12 based on a detection result of the post-separation sensor 12, the CPU 301 (FIG. 2) detects the presence or absence of the next original on the original tray 30 based on a detection result of the original presence/absence detection sensor 16.

At a time point at which the original S is conveyed toward the registration rollers 3, the rotation of the registration rollers 3 has been stopped. The original S is conveyed by the separation roller 2 for a predetermined time period even after a leading edge of the original S abuts against the stopped registration rollers 3. As a result, a warpage or deflection is formed on the leading edge side. In this manner, the skew feeding of the original S is corrected in the conveyance direction. The rotation of the registration rollers 3 is started after the skew feeding is corrected, and the original S is conveyed to the rollers 4. The rollers 4 convey the original S to the roller 5. The original S is conveyed to a space between the roller 5 and the flow reading glass 201. The space between the roller 5 and the flow reading glass 201 corresponds to a reading position, and the original image of the original S is read by the reader 200 while the original S passes through the reading position.

Before the original S is conveyed to the reading position, the read sensor 14 detects the leading edge of the original S. The CPU 301 (FIG. 2) counts the time from the timing at which the read sensor 14 detects the leading edge of the original S until the original S reaches the reading position, by a clock of a conveyance motor (not shown) serving as a drive source for the rollers 4 and the roller 5. A reading leading-edge position at which the reader 200 reads the leading edge of the original is determined based on the counting result. In this manner, the reader 200 can read the original image at a timing at which the leading edge of the original S reaches the reading position.

The scanner unit 209 waiting at a position right below the flow reading glass 201 after the shading correction reads the original image of the original S passing through the reading position. Therefore, the scanner unit 209 uses the light source 203 to irradiate the original S passing through the reading position with light through intermediation of the flow reading glass 201. The radiated light is reflected by a surface to be read of the original S. The reflected light is guided to the lens 207 by the reflection mirrors 204, 205, and 206. The lens 207 images the reflected light on a light receiving portion of the sensor unit 210. The sensor unit 210 outputs, to the reader image processor 211, an electrical signal generated by photoelectrically converting the reflected light received by the light receiving portion. The sensor unit 210 includes a linear image sensor 501 (FIG. 7) including photoelectric conversion elements configured to photoelectrically convert the reflected light. Examples of the photoelectric conversion element include a charge coupled device (CCD) image sensor. The sensor unit 210 may be, in place of the linear image sensor, a complementary metal-oxide-semiconductor (CMOS) image sensor. The reader image processor 211 subjects the electrical signal received from the sensor unit 210 to predetermined image processing to generate an image signal. The reader image processor 211 transmits the image signal to the printer 300.

The original S having passed through the reading position is conveyed to the discharge rollers 7 by the post-original-reading rollers 6. The discharge rollers 7 discharge the original S to the sheet discharge tray 31. At this time, the original S is detected by the sheet discharge sensor 15. The sheet discharge sensor detects the trailing edge of the original S. When the original S is discharged to the sheet discharge tray 31, the image reading processing of one original S is ended.

When the scanner unit 209 reads the original image of the original S placed on the platen 202, the scanner unit 209 uses the light source 203 to irradiate the original S with light through intermediation of the platen 202 while moving in the arrow "a" direction. The reflected light of the radiated light is guided to the lens 207 by the reflection mirrors 204, 205, and 206 to be imaged by the lens 207 on the light receiving portion of the sensor unit 210. The processing of the sensor unit 210 and the reader image processor 211 is as described above.

Printer 300

The printer 300 includes image forming portions 120, 130, 140, and 150, an exposing device 110, a transfer belt 111, a fixing device 114, and a printer control unit 109. The image forming portions 120, 130, 140, and 150 are only different in colors of images to be formed, and have similar configurations to perform similar operations. The image forming portion 120 forms a yellow (Y) image. The image forming portion 130 forms a magenta (M) image. The image forming portion 140 forms a cyan (C) image. The image forming portion 150 forms a black (K) image. Description is here given of the configuration of the image forming portion 120, and description of the configurations of other image forming portions 130, 140, and 150 is omitted.

The image forming portion 120 includes a photosensitive drum 121, a charging device 122, a developing device 123, a transfer blade 124, and a surface electrometer 125. The photosensitive drum 121 is a drum-shaped photosensitive member having a surface with a photosensitive layer. The photosensitive drum 121 rotates in the clockwise direction of FIG. 1. The charging device 122 uniformly charges the surface of the rotating photosensitive drum 121 at a predetermined potential. On the surface of the photosensitive drum 121, an electrostatic latent image is formed by scanning the charged surface with a laser beam by the exposing device 110. The exposing device 110 includes a semiconductor laser 310 (FIG. 2) functioning as a light source. The semiconductor laser 310 (FIG. 2) is controlled by the printer control unit 109 to irradiate the photosensitive drum 121 with a laser beam. The developing device 123 develops the electrostatic latent image with developer (for example, toner) to form a toner image on the surface of the photosensitive drum 121.

The transfer blade 124 is provided so as to sandwich the transfer belt 111 between the transfer blade 124 and the photosensitive drum 121. The transfer belt 111 conveys a sheet to be subjected to image formation. The transfer blade 124 discharges electricity to transfer the toner image formed on the photosensitive drum 121 onto the sheet conveyed by the transfer belt 111. In this manner, a yellow toner image is formed on the sheet.

Similarly, a magenta toner image is formed on a photosensitive drum 131 of the image forming portion 130. A cyan toner image is formed on a photosensitive drum 141 of the image forming portion 140. A black toner image is formed on a photosensitive drum 151 of the image forming portion 150. The magenta toner image formed on the photosensitive drum 131 is transferred in superimposition onto the yellow toner image on the sheet. The cyan toner image formed on the photosensitive drum 141 is transferred in superimposition onto the yellow and magenta toner images on the sheet. The black toner image formed on the photosensitive drum 151 is transferred in superimposition onto the yellow, magenta, and cyan toner images on the sheet. The toner images of the four colors are transferred in superimposition, and thus full-color toner images are formed on the sheet.

The sheet having the full-color toner images formed thereon is conveyed to the fixing device 114 by the transfer belt 111. The fixing device 114 fixes the transferred toner images to the sheet. For example, the fixing device 114 heats and melts the toner images and applies pressure thereto to fix the toner images to the sheet. In this manner, an image is formed on the sheet. The sheet having the image formed thereon is discharged to the outside of the printer 300.

Surface electrometers 125, 135, 145, and 155 of the image forming portions 120, 130, 140, and 150 measure surface potentials of the photosensitive drums 121, 131, 141, and 151, respectively. Contrast potentials are adjusted based on results of measurement by the surface electrometers 125, 135, 145, and 155.

The printer control unit 109 generates a control signal for the exposing device 110 based on the R, G, and B image signals received from the reader image processor 211. The control signal is, for example, a pulse width modulation (PWM) signal. The exposing device 110 scans the surfaces of the photosensitive drums 121, 131, 141, and 151 with the laser beam modulated based on the control signal. In this manner, electrostatic latent images corresponding to the image signal are formed on the surfaces of the photosensitive drums 121, 131, 141, and 151.

FIG. 2 is an explanatory diagram of the printer control unit 109. The operation of the printer control unit 109 is controlled by the CPU 301. The CPU 301 is a main controller configured to control the operation of the printer 300 by executing a control program stored in a memory 302, to thereby perform image forming processing onto the sheet. The memory 302 is a read only memory (ROM) or a random access memory (RAM), and stores a control program or various types of data. The CPU 301 and the memory 302 are provided in the printer 300.

The printer control unit 109 receives the image signals from the reader 200 or a server 500. The server 500 is an external device (print server) provided separately from the printer 300 and to be connected to the printer 300 via a local area network (LAN) or other networks. The number of tone levels of each of the image signals of R, G, and B is represented by 8 bits. The printer control unit 109 includes a color processing unit 303, a tone control unit 311, a dither processing unit 307, a PWM unit 308, and a laser driver 309. The printer control unit 109 converts each of the image signals of R, G, and B into a PWM signal to control light emission of the semiconductor laser 310 provided in the exposing device 110. The image signals of R, G, and B are input to the color processing unit 303.

The color processing unit 303 performs image processing and color processing on the input image signals so that a desired output result (image) can be obtained in a case where the printer 300 has an ideal output characteristic. The color processing unit 303 increases the number of tone levels of the image signal to 10 bits from 8 bits in order to improve the accuracy. The color processing unit 303 includes a LUTid 304 being a look-up table. The LUTid 304 is a luminance-density conversion table for converting luminance information included in the image signal into density information. The color processing unit 303 uses the LUTid 304 to convert luminance information of the image signals of R, G, and B into density information of the image signals of yellow (Y), magenta (M), cyan (C), and black (K). The image signals of Y, M, C, and K are input to the tone control unit 311.

The tone control unit 311 includes an under color removal (UCR) unit 305 and a LUTa 306 being a γ look-up table. The tone control unit 311 corrects the tone of the image signals of Y, M, C, and K so that a desired output result (image) can be obtained in accordance with the actual output characteristic of the printer 300. The UCR unit 305 regulates the integrated value of the image signal in each pixel to limit the total sum of the image signal levels. When the total sum exceeds the regulation value, the UCR unit 305 performs under color removal processing of replacing a predetermined amount of C, M, and Y image signals into K image signals, to thereby reduce the total sum of the image signal levels. The total sum of the image signal levels is regulated in order to regulate a toner laid-on level at the time of image formation by the printer 300. The LUTa 306 is a 10-bit conversion table (conversion condition) for correcting the density characteristic, and, for example, is used to change the γ characteristic of the printer 300. The image signals of Y, M, C, and K subjected to tone correction are input to the dither processing unit 307.

The dither processing unit 307 performs dither processing on the 10-bit image signals of Y, M, C, and K subjected to tone correction, to thereby perform halftone processing (dither processing) of converting the 10-bit image signals of Y, M, C, and K into 4-bit signals. The PWM unit 308 performs pulse width modulation on the signals subjected to dither processing to generate the PWM signal corresponding to the control signal for the exposing device 110. The PWM signal is input to the laser driver 309. The laser driver 309 controls the light emission of the semiconductor laser 310 in accordance with the PWM signal.

Calibration Operation

Figure 3:
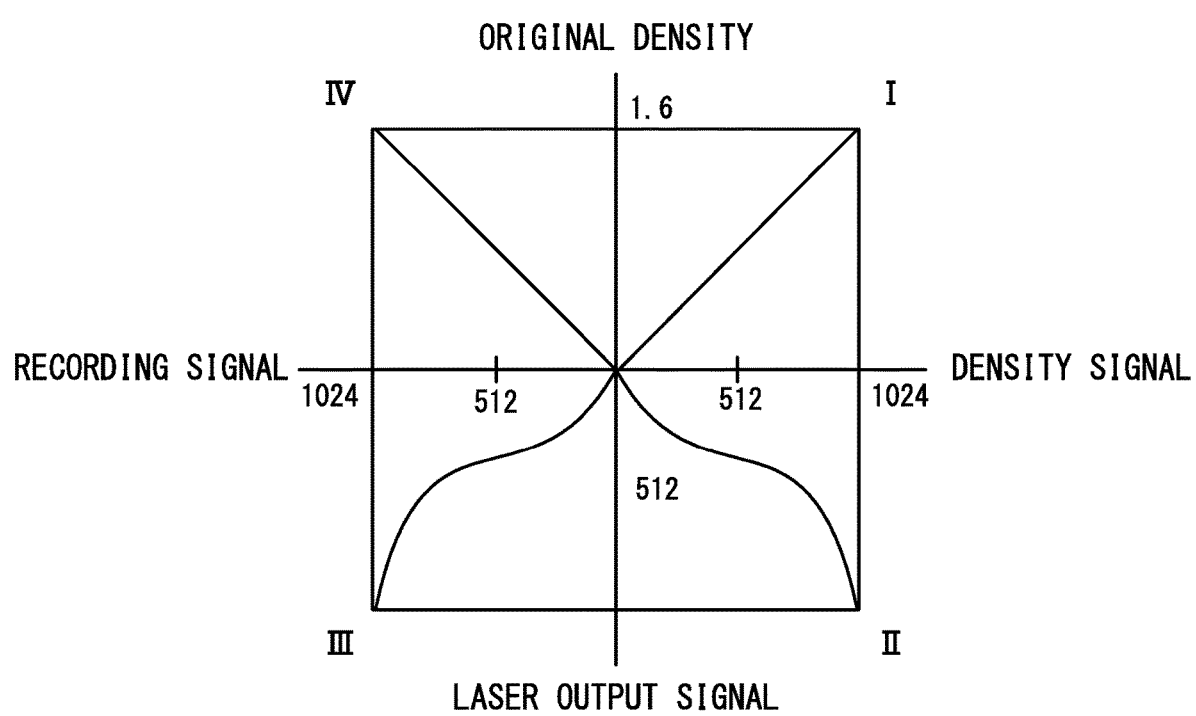
FIG. 3 is a four-quadrant chart.

Calibration for obtaining a desired density and tone characteristic is performed by updating the LUTa 306. FIG. 3 is a four-quadrant chart for illustrating a state in which the image signal is converted in order to correct the tone characteristic.

Quadrant I represents a reading characteristic of the reader 200. The reading characteristic is a characteristic for converting the density (original density) of the original image formed on the original S into a density signal. The characteristic of converting the original density into the density signal may differ between a case in which the original image is read through use of the platen 202 and a case in which the original image is read through use of the ADF 100. Quadrant II represents a conversion characteristic of the tone control unit 311 (LUTa 306). The conversion characteristic is a characteristic of converting the density signal into a laser output signal representing the amount of light of the laser beam to be output from the semiconductor laser 310. Quadrant III represents a recording characteristic of the printer 300. The recording characteristic is a characteristic of converting the laser output signal into an output density representing the density of the image to be formed on the sheet. Quadrant IV represents a tone reproducing characteristic of the entire apparatus. The tone reproducing characteristic is a tone characteristic representing a relationship between an original density and a recorded density of the image formed on the sheet.

The printer 300 of at least one embodiment corrects a non-linear part of the recording characteristic of the printer 300 in Quadrant III by the conversion characteristic of the tone control unit 311 in Quadrant II in order to obtain a linear tone characteristic in Quadrant IV. The LUTa 306 is formed by exchanging the input and the output of the characteristic of Quadrant III obtained when the test chart is output without performing the processing by the tone control unit 311. In at least one embodiment, the number of output tone levels is 256 levels, but the tone control unit 311 has 1,024 levels because the tone control unit 311 processes 10-bit digital signals.

Figure 4:
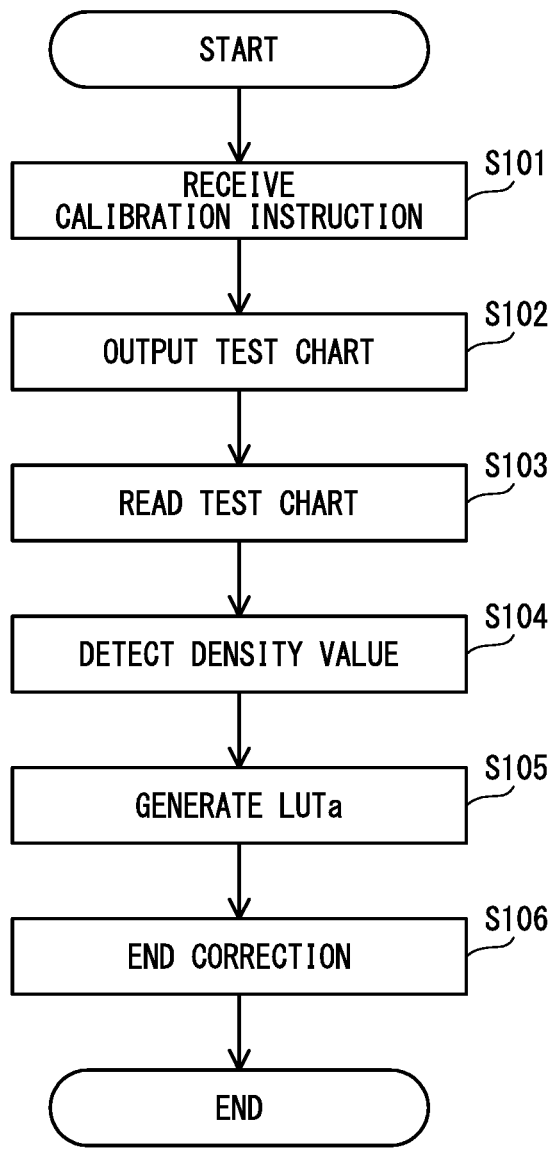
FIG. 4 is a flow chart for illustrating calibration processing.

FIG. 4 is a flow chart for illustrating the calibration processing. In the calibration processing, the tone characteristic and other image forming conditions are determined. FIG. 5A and FIG. 5B are exemplary diagrams of the operation screen to be displayed on a display of the operation panel 400 at the time of the calibration processing. Before the calibration processing is started, sheets having a predetermined size are set to a sheet feeding stage of the printer 300. An instruction to start execution of the calibration processing is issued through the operation screen exemplified in FIG. 5A and displayed on the display of the operation panel 400.

When the user selects a "PRINT" button of the operation screen of FIG. 5A through the operation panel 400, the CPU 301 receives the instruction to execute the calibration (Step S101). The CPU 301 outputs a test chart including an image for calibration (for adjustment of image density) onto the sheet (Step S102). For example, the CPU 301 inputs test image signals of R, G, and B representing the test chart to the printer control unit 109. The printer control unit 109 uses the color processing unit 303, the tone control unit 311, the dither processing unit 307, and the PWM unit 308 to perform processing on the test image signals, and uses the laser driver 309 to control the light emission of the semiconductor laser 310. At this time, the processing performed by the LUTa 306 of the tone control unit 311 is bypassed, and the test image signals output from the UCR unit 305 are directly input to the dither processing unit 307. That is, the test image signals are not subjected to tone correction.

FIG. 6 is an explanatory view of the test chart. The test chart is an image for adjustment of the image density, and includes a plurality of patch images having different densities. In at least one embodiment, the test chart includes patch images A1 to Y20, M1 to M20, C1 to C20, and K1 to K20 having 20 tone levels for each of the colors of yellow (Y), magenta (M), cyan (C), and black (K). The test chart includes the patch images of each color arranged in 10 rows and 2 columns vertically and horizontally. The patch images having 20 tone levels are formed by 20-level image signal values with an image density of every 5% from 5% to 100%. A plurality of test charts having different resolutions may be prepared. The test chart of FIG. 6 is an example including a screen A and a screen B having different screen rulings. The screen A has a screen ruling of 180 lines per inch (lpi). The screen B has a screen ruling of 300 lpi.

The test chart with each screen ruling is formed by the dither processing unit 307 performing dither processing having a parameter for obtaining the corresponding ruling. The printer 300 of at least one embodiment outputs test charts having the same tone level with two types of screen rulings. In a case where the tone characteristic greatly varies depending on the difference in screen ruling, the CPU 301 is preferred to set the tone level in accordance with the screen ruling.

Further, in a case where the printer 300 is capable of forming images with two or more types of screen rulings, the test chart for calibration may be formed in a divided manner onto a plurality of pages for each screen ruling. In order to accurately perform the calibration, the number of tone levels of the patch images to be formed in the test chart is desired to be large. Further, in order to ensure the reading accuracy of the reader 200, the patch image is required to have a certain large size or more. Two types of screens are used for description of at least one embodiment, however, the test chart may have three or more types of screens. In a case of an apparatus capable of switching the screen by a change-over switch to use the screen, patch images having a large number of tone levels are required for many kinds of screens. It is therefore difficult to form the patch images within one test chart. In many cases, as illustrated in FIG. 6, the test chart to be used for calibration is formed on a plurality of sheets.

After the test chart is output, the CPU 301 causes the reader 200 to read the test chart (Step S103). Therefore, after the test chart is output, the CPU 301 displays the operation screen exemplified in FIG. 5B on the display of the operation panel 400. With this, the CPU 301 instructs the user to place the test chart on the original tray 30 of the ADF 100. After the user places the test chart on the ADF 100, the uses selects an "EXECUTE READING" button on the operation screen of FIG. 5B, and thus the CPU 301 receives the instruction to read the test chart. In response to the reception of the reading instruction, the CPU 301 causes the ADF 100 to start conveyance of the test chart. Further, the CPU 301 causes the reader 200 to read the conveyed test chart.

The image signals (luminance values) of R, G, and B, which are reading results (reading data) of reading the test chart by the reader 200, are input to the color processing unit 303. The CPU 301 uses the LUTid 304 of the color processing unit 303 to convert the luminance values of R, G, and B into density values, to thereby detect the density values of the patch images of the test chart (Step S104). The CPU 301 forms a tone correction table LUTa(X) based on the detected density values (Step S105). The CPU 301 writes the formed tone correction table LUTa(X) into the memory 302. In Step S105, the CPU 301 can obtain the recording characteristic of the printer 300 in Quadrant III of FIG. 3 based on the density values of the patch images of the test chart. The LUTa of the printer 300 is determined by exchanging the input and the output of the recording characteristic of the printer 300 in Quadrant III. The CPU 301 sets the determined LUTa to the tone control unit 311 (LUTa 306), and ends the calibration (Step S106).

In at least one embodiment, only patch images for 20 tone levels are formed on the test chart, and hence the CPU 301 forms required data by interpolating insufficient data. With such calibration, a tone characteristic that is linear with respect to a target density is achieved.

Dust Detection

Figure 7:
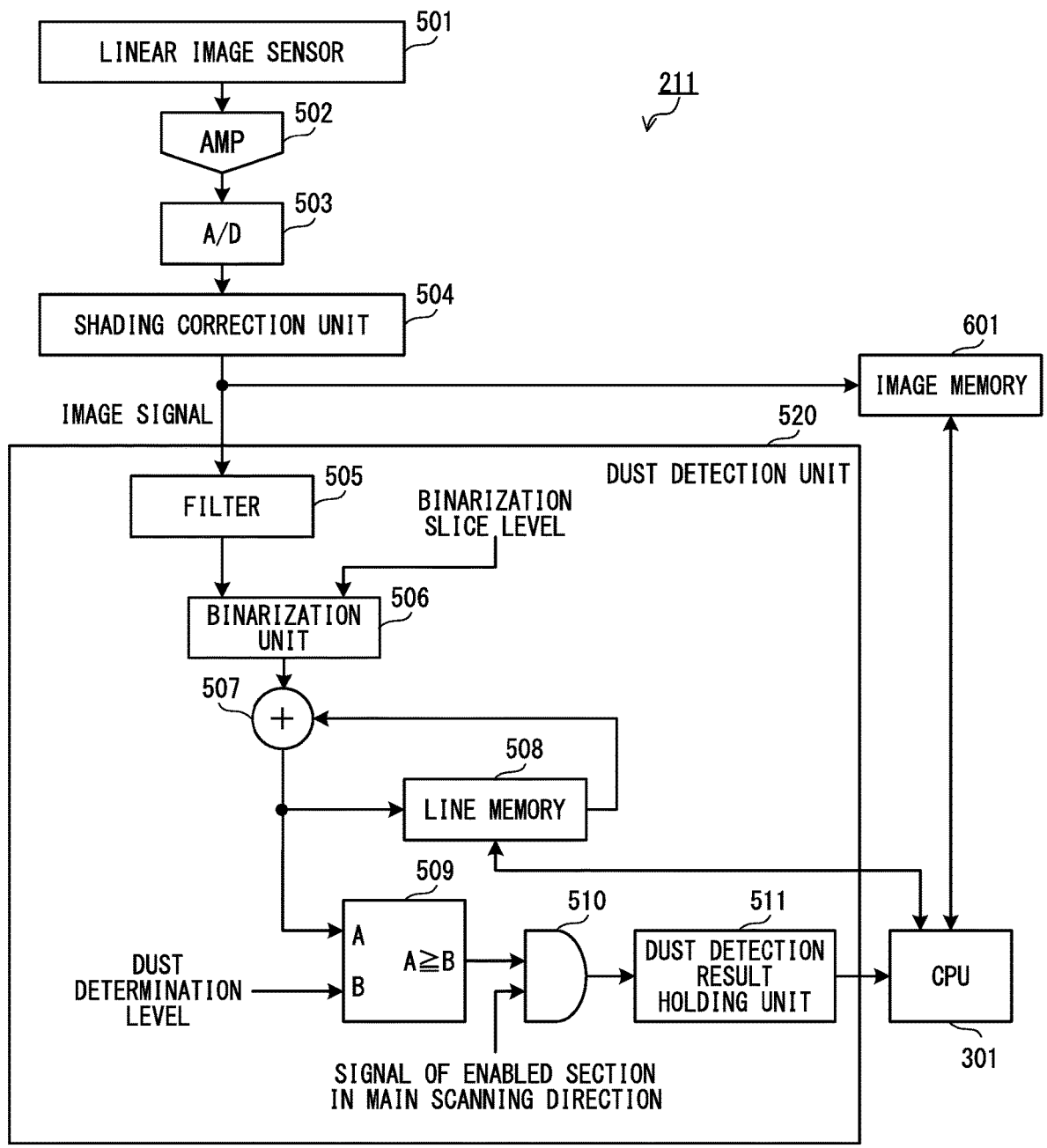
FIG. 7 is a functional block diagram for illustrating a dust detection unit.

FIG. 7 is a functional block diagram of a dust detection unit provided in the reader image processor 211 in the reader 200. The reader image processor 211 includes an amplifier 502, an A/D converter 503, a shading correction unit 504, and a dust detection unit 520. The reader image processor 211 receives an electrical signal being an analog signal output from the linear image sensor 501 provided in the sensor unit 210. The linear image sensor 501 includes a plurality of photoelectric conversion elements that are linearly arrayed. The direction in which the photoelectric conversion elements are linearly arrayed corresponds to a main scanning direction. The linear image sensor 501 reads each line in the main scanning direction when reading the image. In the linear image sensor 501, the photoelectric conversion elements are arrayed so as to be orthogonal to the conveyance direction of the original S. That is, the main scanning direction is orthogonal to the conveyance direction of the original S. The conveyance direction of the original S corresponds to a sub-scanning direction.

The reader image processor 211 uses the amplifier 502 to amplify the electrical signal received from the linear image sensor 501, and then uses the A/D converter 503 to convert the amplified electrical signal into a digital signal. The reader image processor 211 uses the shading correction unit 504 to perform shading correction on the electrical signal converted into a digital signal to generate reading data. The reader image processor 211 stores the generated reading data into an image memory 601 provided in the printer 300, and inputs the generated reading data to the dust detection unit 520.

The dust detection unit 520 includes a filter 505, a binarization unit 506, an adder 507, a line memory 508, a comparator 509, an AND operation unit 510, and a dust detection result holding unit 511. The dust detection unit 520 is an abnormality detection unit configured to detect an abnormal image of dust or the like from an image (read image) read by the reader 200 to transmit the detection result to the CPU 301.

Figure 8A:
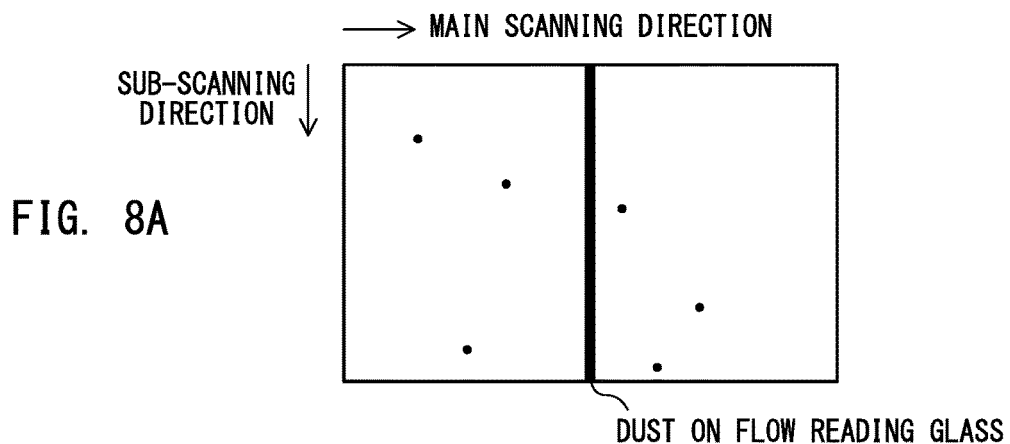
FIG. 8A and FIG. 8B are explanatory diagrams for illustrating a case in which a read image is binarized.
Figure 8B:
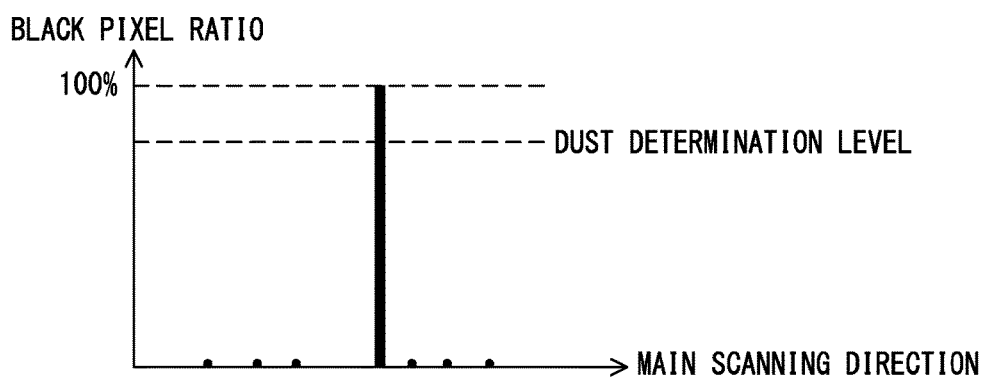

The dust detection unit 520 uses the filter 505 to perform emphasizing processing of emphasizing a high-frequency component on the image signal. The binarization unit 506 performs pre-processing on the image signal passed through the filter 505 so as to facilitate the detection of a black streak or the like generated on the read image due to the influence of dust. The binarization unit 506 compares the signal level of the image signal with a binarization slice level to convert the image signal into binary data. FIG. 8A and FIG. 8B are explanatory diagrams for illustrating a case in which the roller 5 is read and the read image of the roller 5 is binarized. The roller 5 is white so as not to affect the read image of the original S.

When the flow reading glass 201 is dirty by dust or the like, the read image of the roller 5 has a linear black streak (streak image) in the sub-scanning direction even after the binarization (FIG. 8A). Black dots periodically appearing at the same position in the main scanning direction are images caused by dust or other dirt adhering onto the white surface of the roller 5. Therefore, the period in which the black dots appear matches the circumferential length of the roller 5.

The adder 507 uses the line memory 508 to cumulatively add values of binarized image signals at the same address in the main scanning direction for predetermined number of lines. This processing is called sampling addition. FIG. 8B is an example of a result of the sampling addition, and represents a black pixel ratio with respect to each position in the main scanning direction. The black pixel ratio represents a ratio at which a black image appears in the sub-scanning direction with the binarized image signal at the same position in the main scanning direction. At the position at which the black streak is generated, the black pixel ratio is 100%. The influence of the dust or other dirt adhering onto the roller 5 appears as a low black pixel ratio. Therefore, it is determined that the position in the main scanning direction of the flow reading glass 201 at which the black pixel ratio is larger than a predetermined black pixel ratio (dust determination level) is a dust position at which dust or other dirt is present.

The comparator 509 is a determination unit configured to compare the sampling addition result with the dust determination level to perform dust determination for each address in the main scanning direction. The AND operation unit 510 performs an operation for enabling the dust determination result within an enabled section in the main scanning direction based on the dust determination result from the comparator 509 and a signal of an enabled section in the main scanning direction. Specifically, the AND operation unit 510 is an enabling unit configured to determine whether or not to enable the dust determination result through an AND operation between the dust determination result and the signal of the enabled section in the main scanning direction. The dust detection result holding unit 511 holds the dust determination result that is determined to be enabled as an operation result of the AND operation unit 510.

The CPU 301 refers to the dust detection result holding unit 511 to check the dust detection result. Further, the CPU 301 can also refer to the line memory 508 to compare the stored data with the dust determination level, to thereby receive the position (address) in the main scanning direction at which the dust is detected. This position (address) is used as an address of a dust-detected pixel (abnormality-detected pixel). The CPU 301 performs dust correction on the image signal of the dust-detected pixel of the image signal stored in the image memory 601.

Dust Correction

Figure 9A:
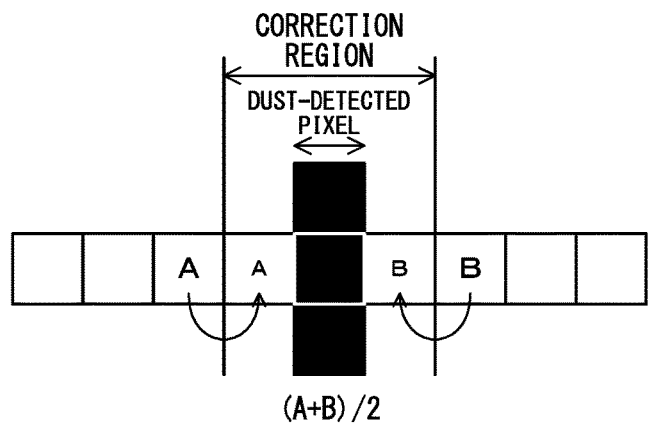
FIG. 9A and FIG. 9B are explanatory views of dust correction.
Figure 9B:
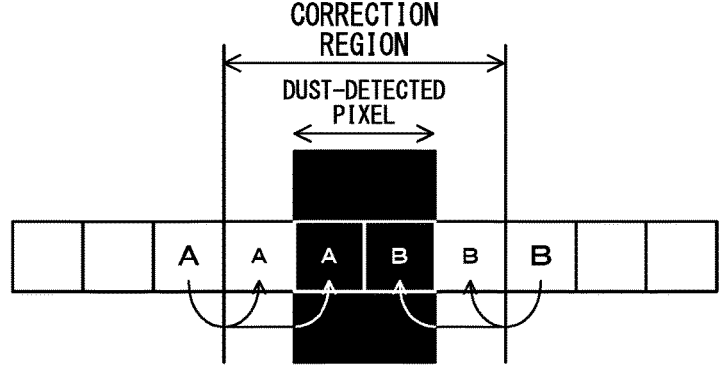

Dust correction is performed by interpolating or replacing the pixel to be corrected (dust-detected pixel) with data of surrounding pixels. FIG. 9A and FIG. 9B are explanatory views of dust correction. FIG. 9A is an illustration of dust correction of a case in which there is one dust-detected pixel. FIG. 9B is an illustration of dust correction of a case in which there are two dust-detected pixels. In any of the cases, the dust correction is performed by interpolating or replacing pixels in a correction region in which one pixel is added to each of both sides of the dust-detected pixel(s) in the main scanning direction with pixel data of right and left pixels (A and B). The dust correction may be performed by methods other than interpolation and replacement. Further, the dust correction may be performed by logic circuits other than the CPU 301.

Calibration of at Least One Embodiment

In at least one embodiment, in order to reduce the load of the user, at the time of calibration, the reading of the test chart exemplified in FIG. 6 is performed through use of the ADF 100. The image densities of the patch images of each color used at the time of calibration are detected from the reading result (read image) of the test chart. FIG. 10A to FIG. 10C are explanatory views of a detection range of the image density. In at least one embodiment, the image density of each color is not an average value of reading results in the entire region of each patch image of the test chart, but is an average value of the reading results of a center portion of the patch image having a stable image density, as in an area surrounded by the broken line of FIG. 10A.

In a case in which the flow reading glass 201 has dust or other dirt, when the test chart is read through use of the ADF 100, as illustrated in FIG. 10B, a black streak is generated in the sub-scanning direction in the read image. At the time of calibration, the read image of the test chart is not subjected to dust correction as described above. In this case, as indicated by the broken line of FIG. 10C, the image density is detected within a range excluding the data of the dust-detected pixel, in which the image density can be accurately detected. Therefore, in at least one embodiment, the dust correction is not performed when the ADF 100 is used at the time of calibration, and calibration is executed by the remaining read image (image signal) excluding the data at the position corresponding to the dust-detected pixel. In this manner, even when the flow reading glass 201 has dust or other dirt, the calibration using the ADF 100 can be performed with high accuracy.

Further, the printer 300 may have a configuration in which the printer 300 includes a photosensitive belt in place of the photosensitive drum 121. The photosensitive belt is a belt-like photosensitive member having a surface with a photosensitive layer. Further, the printer 300 may have a configuration in which the printer 300 includes a transfer roller in place of the transfer blade 124. The transfer roller is applied with a transfer voltage similarly to the transfer blade so that the toner image formed on the photosensitive drum 121 is transferred onto the sheet on the transfer belt 111. Further, the reader 200 is not limited to a configuration in which the flow reading glass 201 and the platen 202 are separately provided, and the reader 200 may have a configuration in which a part of the platen 202 functions as the flow reading glass 201.

First Example

Figure 11:
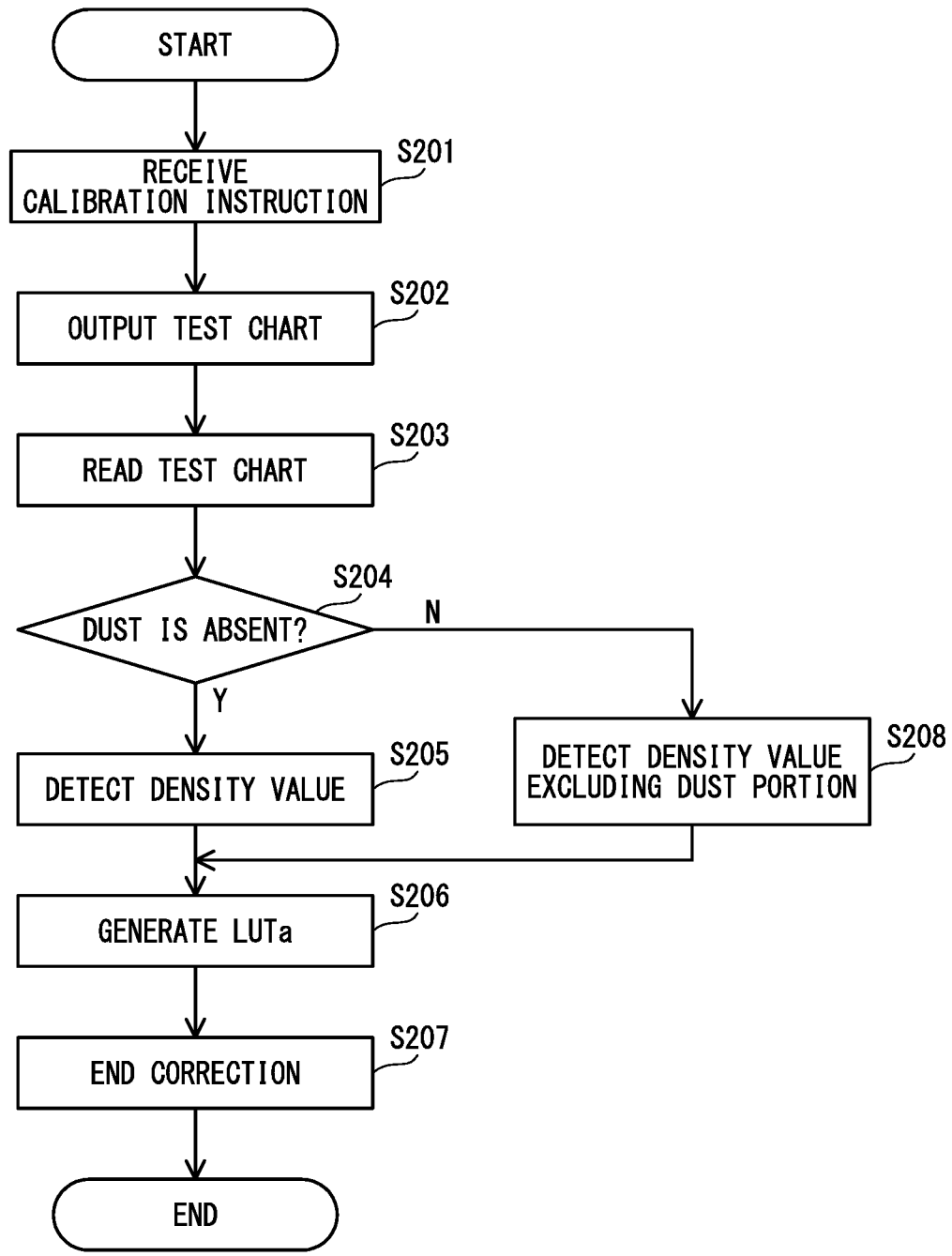
FIG. 11 is a flow chart for illustrating the calibration processing.

FIG. 11 is a flow chart for illustrating the calibration processing. Similarly to the processing of Steps S101 to S103 of FIG. 4, the CPU 301 receives an instruction to execute the calibration to output the test chart, and starts the reading processing using the ADF 100 (Steps S201, S202, and S203). The test charts are successively output on a plurality of sheets. The ADF 100 successively reads the test charts. Based on the result of reading the test charts, the dust detection unit 520 of the reader image processor 211 detects the dust. The detection result is stored in the dust detection result holding unit 511 of the dust detection unit 520.

The CPU 301 refers to the dust detection result holding unit 511 to check the dust detection result (Step S204). When dust is absent (Step S204: Y), the CPU 301 performs processing similar to Steps S104 to S106 of FIG. 4 to set the LUTa to the tone control unit 311 (LUTa 306), and ends the calibration (Steps S205, S206, and S207).

When dust is present (Step S204: N), the CPU 301 causes the color processing unit 303 to detect the density value of each patch image in a range excluding the dust-detected pixel as indicated by the broken line in FIG. 10C (Step S208). The CPU 301 performs processing similar to Steps S105 and S106 of FIG. 4 based on the density values detected as described above to set the LUTa to the tone control unit 311 (LUTa 306), and ends the calibration (Steps S206 and S207).

With such processing, even when the flow reading glass 201 has dust or other dirt, the calibration using the ADF 100 can be performed with high accuracy. The signal value corresponding to the dust-detected pixel may be the luminance values of red (R), green (G), and blue (B) in place of the density value. In the case of this configuration, the luminance value corresponding to the dust-detected pixel, excluding an abnormal signal value that is lower than a luminance threshold value, is converted into a density value, and then the tone correction table LUTa(X) is generated based on the density value.

Second Example

Figure 12:
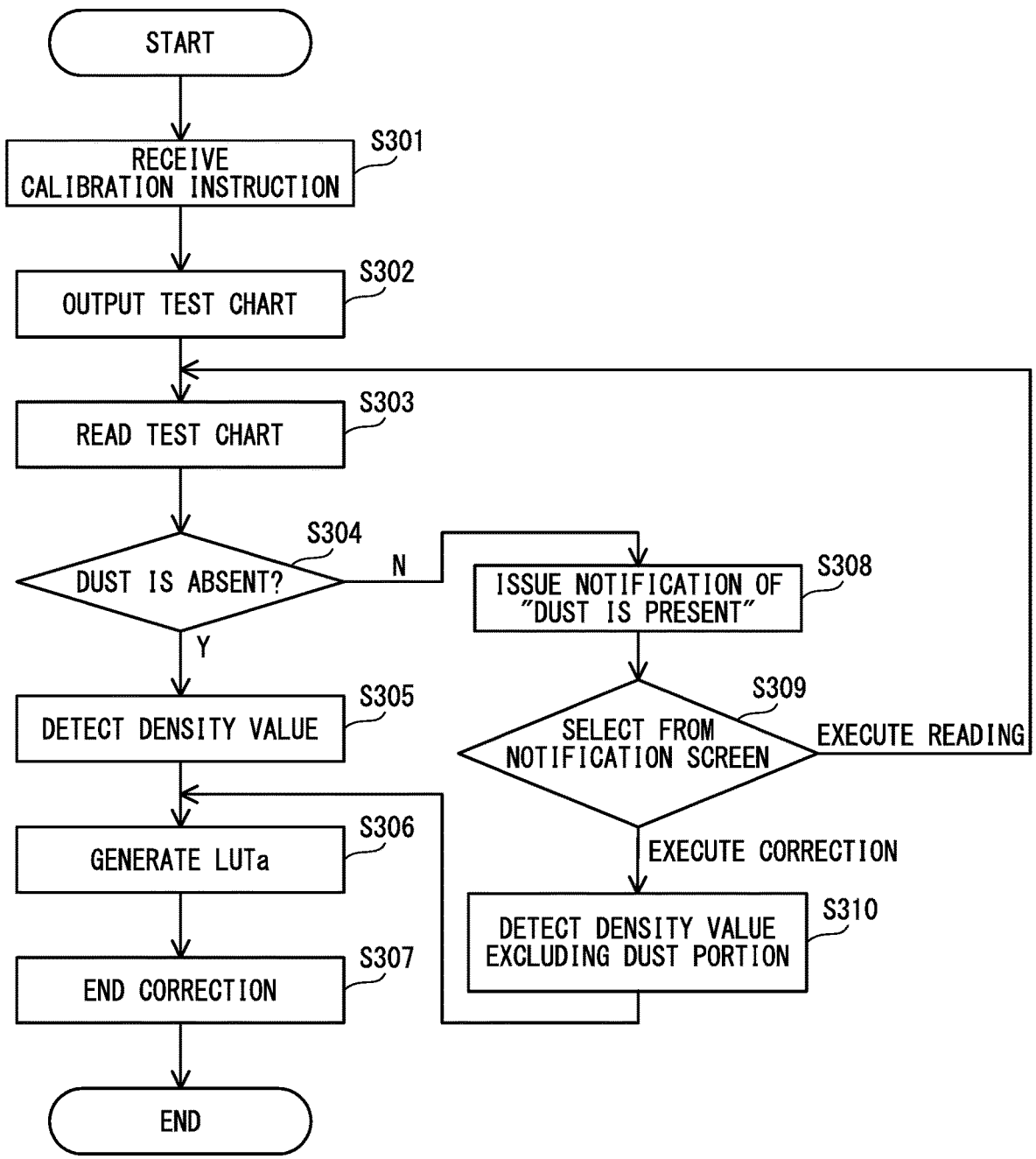
FIG. 12 is a flow chart for illustrating the calibration processing.

FIG. 12 is another flow chart for illustrating the calibration processing. Similarly to the processing of Steps S201 to S204 of FIG. 11, the CPU 301 receives an instruction to execute the calibration to output the test chart, and checks the result of dust detection based on the read image of the test chart (Steps S301 to S304). When dust is absent (Step S304: Y), the CPU 301 performs processing similar to Steps S205 to S207 of FIG. 11 to set the LUTa to the tone control unit 311 (LUTa 306), and ends the calibration (Steps S305, S306, and S307).

Figure 13:
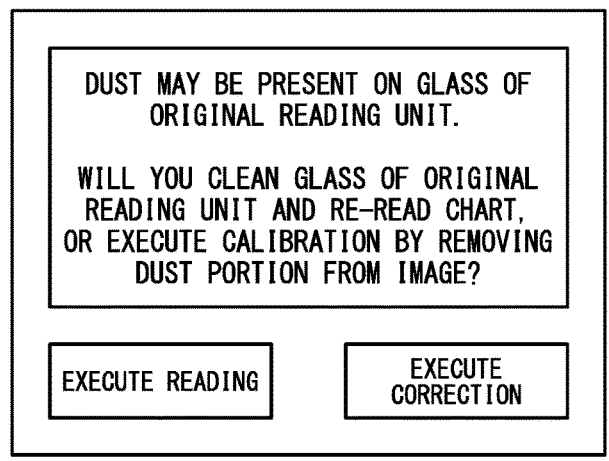
FIG. 13 is an exemplary diagram of a notification screen.

When dust is present (Step S304: N), the CPU 301 displays a notification screen exemplified in FIG. 13 on the display of the operation panel 400 to notify the user that dust is detected (Step S308). The notification screen of FIG. 13 notifies the user that the flow reading glass 201 has dust or other dirt. Further, the notification screen prompts the user to clean the flow reading glass 201, and causes the user to select whether to re-read the test chart or perform calibration while excluding the dust-detected pixel. The user uses the operation panel 400 to select "EXECUTE READING" or "EXECUTE CORRECTION" on the notification screen.

When "EXECUTE READING" is selected (Step S309: EXECUTE READING), the CPU 301 performs the processing of Step S303 and the subsequent steps again to re-read the test chart. When "EXECUTE CORRECTION" is selected (Step S309: EXECUTE CORRECTION), similarly to the processing of Step S208 of FIG. 11, the CPU 301 detects the density value of each patch image in a range excluding the dust-detected pixel (Step S310). The CPU 301 sets the LUTa to the tone control unit 311 (LUTa 306) based on the density value detected as described above, and ends the calibration (Steps S306 and S307).

With such processing, even when the flow reading glass 201 has dust or other dirt, the calibration using the ADF 100 can be performed with high accuracy. Further, the user can be notified of the dirt on the flow reading glass 201, and can be prompted to clean the flow reading glass 201.

Third Example

Figure 14:
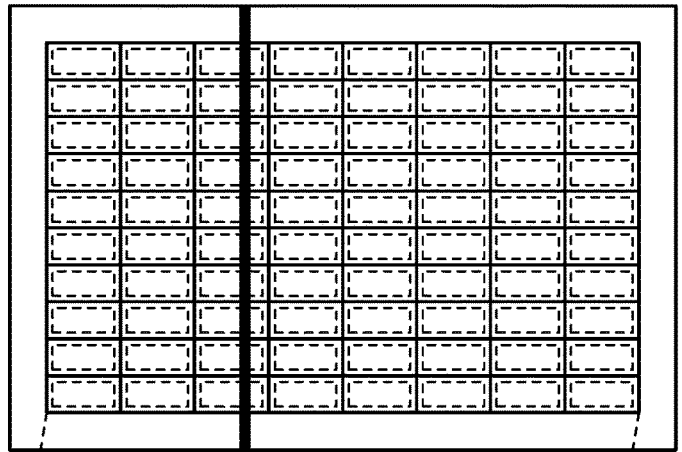
FIG. 14 is an explanatory view for illustrating a case in which an image of the test chart is shifted.
Figure 14:
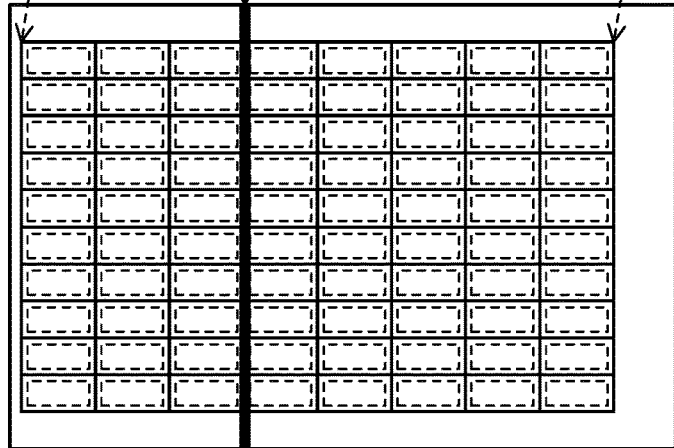

The image reading using the ADF 100 is performed also during normal copying operation and scanning operation. Therefore, presence or absence of dust or other dirt at the reading position is detected also during the normal operation, and the position of the black streak generated in the read image due to the dirt is already known during the normal operation. In view of this, at the time of calibration, the image of the test chart itself can be shifted in the main scanning direction to avoid the influence of the black streak. That is, when the black streak is detected in the read image in advance during the normal operation, the CPU 301 refers to the dust detection result holding unit 511 to check the dust-detected pixel. After that, when the test chart is generated, the CPU 301 shifts a position to form the image of the test chart in accordance with the position of the dust-detected pixel. FIG. 14 is an explanatory view for illustrating a case in which the image of the test chart is shifted.

When the position of the image of the test chart is not shifted, the black streak overlaps the detection range of the image density of the patch image, which is surrounded by the broken line. In such a case, it is effective to shift the position of the image in the main scanning direction. When the position of the image of the test chart is shifted in the main scanning direction, the black streak is prevented from overlapping the detection range of the image density of the patch image, which is surrounded by the broken line. However, this operation is effective when the number of black streaks is 1 or when other black streaks are positioned at the boundaries of the patch images by chance. When a plurality of black streaks are generated, the position of the image of the test chart may be shifted so as to cope with one black streak, and other black streaks may be coped with as in the first example or the second example.

With such processing, even when the flow reading glass 201 has dust or other dirt, the calibration using the ADF 100 can be performed with high accuracy.

In the first to third examples as described above, the test chart of a case in which the tone correction is performed is described. However, test charts for adjusting other image forming conditions or image reading conditions can also be prevented from being affected by dust or other dirt by similar processing. For example, at least one embodiment is also applicable to a test chart for correcting reading unevenness or tilting in the main scanning direction. Further, at least one embodiment is also applicable to a test chart to be used for correction of drive unevenness of the printer 300 or circumferential pitch unevenness of a member. Even when test charts for adjusting all of the image forming conditions and image reading conditions are formed on one sheet, at least one embodiment is applicable. As described above, according to at least one embodiment of the present disclosure, even when the read image of the test chart has abnormality, the calibration can be performed with high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-076956, filed Apr. 15, 2019, which is hereby incorporated by reference herein in its entirety.

What is claimed is:

1. An image forming apparatus, comprising:
a conversion unit configured to convert an image signal based on a conversion condition;
an image forming unit configured to form an image based on the converted image signal;
a document feeder configured to feed an object for reading
a reader that has a transparent member and an image sensor, wherein the image sensor reads the object for reading through the transparent member while the document feeder is feeding the object for reading, and the image sensor reads a plurality of pixels arranged in a predetermined direction;
a reader image processor configured to detect presence or absence of dust on the transparent member based on a reading result of the object for reading read by the reader; and
a controller configured to:
convert, based on an output value of another pixel that is different from a first dust-detected pixel, an output value of the first dust-detected pixel for which presence of the dust is detected in a case where it is determined that the dust is present on the transparent member based on the reading result of the object for reading by the reader;
control the image forming unit to form a test chart having a plurality of patch images on a sheet;
control the document feeder to feed the sheet having the test chart formed thereon;
control the reader to read the test chart on the sheet while the document feeder is feeding the sheet having the test chart formed thereon;
determine data related to the plurality of patch images corresponding to a reading result of the test chart by the reader; and
generate the conversion condition for the conversion unit based on the data related to the plurality of patch images,
wherein in a case where there is a second dust-detected pixel for which the presence of the dust is detected, the controller does not use the second dust-detected pixel when determining the data related to the plurality of patch images in a case where it is determined that the dust is present on the transparent member based on the reading result of the test chart by the reader.

2. The image forming apparatus according to claim 1, further comprising a display,
wherein the controller controls the display to display a screen to prompt a user to clean the transparent member in a case where the reader image processor detects the dust on the transparent member.

3. The image forming apparatus according to claim 1,
wherein the controller, in a case where the dust on the transparent member is detected from the reading result of the test chart by the reader, controls a position of the test chart to be formed on the sheet so that an abnormality reading result by the reader due to the dust on the transparent member is reduced.

4. The image forming apparatus according to claim 1,
wherein the reader reads an original while the original is fed by the document feeder, and
wherein the reader reads the test chart on the sheet while the sheet is fed by the document feeder.

5. The image forming apparatus according to claim 1, wherein the conversion condition includes a tone correction table to correct a tone characteristic of an image to be formed by the image forming unit.

6. The image forming apparatus according to claim 1,
wherein the reader includes a platen, and
wherein the reader is further configured to read an original placed on the platen.

7. The image forming apparatus according to claim 1,
wherein the reader includes a platen that is different from the transparent member, and
wherein the reader is further configured to:
read an original placed on the platen; and
read the sheet having the test chart formed thereon and being placed on the platen.

8. The image forming apparatus according to claim 1,
wherein the plurality of patch images include a first patch image and a second patch image formed at a position different from that of the first patch image in the predetermined direction;
wherein the controller determines, based on the reading result of the test chart by the reader, first data related to the first patch image based on the output values of first pixels included in the plurality of pixels;
wherein the controller determines, based on the reading result of the test chart by the reader, second data related to the second patch image based on output values of second pixels, which are different from the first pixels, included in the plurality of pixels, and
wherein, in a case where the second pixels include the second dust-detected pixel, the controller determines the second data based on an output value of pixels other than the second dust-detected pixel included in the second pixels.

9. The image forming apparatus according to claim 1,
wherein, in a case where it is determined that the dust is present on the transparent member based on the reading result of the test chart by the reader, the controller does not convert an output value of the second dust-detected pixel for which the presence of the dust is detected.

* * * * *